US012683199B2

(12) United States Patent
Matsuda

(10) Patent No.: US 12,683,199 B2
(45) Date of Patent: Jul. 14, 2026

(54) BATTERY MANAGEMENT METHOD, STORAGE MEDIUM, STORAGE CONTROLLER, AND MOVABLE BODY

(71) Applicant: KAWASAKI MOTORS, LTD., Akashi (JP)

(72) Inventor: Yoshimoto Matsuda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 130 days.

(21) Appl. No.: 18/465,327

(22) Filed: Sep. 12, 2023

(65) Prior Publication Data

US 2024/0088457 A1    Mar. 14, 2024

(30) Foreign Application Priority Data

Sep. 14, 2022    (JP) ................................. 2022-146359

(51) Int. Cl.
| | |
|---|---|
| *H01M 10/42* | (2006.01) |
| *B60L 58/12* | (2019.01) |
| *G07C 5/08* | (2006.01) |
| *G07C 5/10* | (2006.01) |
| *H01M 10/48* | (2006.01) |
| *H02J 7/82* | (2026.01) |

(52) U.S. Cl.
CPC ........ *H01M 10/425* (2013.01); *G07C 5/0816* (2013.01); *G07C 5/10* (2013.01); *H01M 10/4221* (2013.01); *H01M 10/48* (2013.01); *H01M 10/486* (2013.01); *H02J 7/82* (2026.01); *B60L 58/12* (2019.02); *B60L*

*2240/545* (2013.01); *H01M 2010/4271* (2013.01); *H01M 2220/20* (2013.01)

(58) Field of Classification Search
CPC ............ G07C 5/0816; H01M 10/4221; H01M 2220/20; B60L 58/12; B60L 2240/545; B60L 3/0046; B60L 53/65; B60L 58/13
See application file for complete search history.

(56) References Cited

U.S. PATENT DOCUMENTS

| | | | |
|---|---|---|---|
| 2013/0200902 A1 | 8/2013 | Kurimoto | |
| 2014/0232356 A1 | 8/2014 | Kyoung | |
| 2018/0123357 A1* | 5/2018 | Beaston ................. | H02J 3/381 |
| 2018/0284197 A1 | 10/2018 | Cui et al. | |
| 2019/0391577 A1* | 12/2019 | Uppalapati .............. | B60L 3/12 |
| 2020/0122603 A1 | 4/2020 | Kubo et al. | |
| 2021/0001744 A1 | 1/2021 | Suzuki | |
| 2021/0149355 A1* | 5/2021 | Yamaguchi ........... | H04W 12/71 |
| 2022/0021220 A1* | 1/2022 | Matsumoto ........ | G06Q 30/0268 |

(Continued)

FOREIGN PATENT DOCUMENTS

| | | | |
|---|---|---|---|
| DE | 102013209453 A1 | 11/2014 | |
| EP | 2629109 B1 | 6/2022 | |

(Continued)

*Primary Examiner* — Roy Rhee
(74) *Attorney, Agent, or Firm* — Alleman Hall LLP

(57) ABSTRACT

A battery management method according to one aspect includes: detecting information by at least one sensor, the information being related to a state of a battery mounted on a vehicle body; classifying the state of the battery into any one of predetermined state categories based on the information detected by the at least one sensor; and storing in a memory a frequency of occurrence of the state of the battery corresponding to the state category.

11 Claims, 10 Drawing Sheets

(56)          References Cited

U.S. PATENT DOCUMENTS

| | | | | |
|---|---|---|---|---|
| 2023/0115708 A1* | 4/2023 | Xiang | ............... | B60W 60/0053 |
| | | | | 701/23 |
| 2023/0182575 A1* | 6/2023 | Kim | ........................ | B60L 53/68 |
| | | | | 701/22 |
| 2023/0286405 A1 | 9/2023 | Suzuki | | |

FOREIGN PATENT DOCUMENTS

| | | | |
|---|---|---|---|
| JP | 5898778 | B | 4/2016 |
| JP | 2020004417 | A | 1/2020 |
| WO | 2012049852 | A1 | 4/2012 |

* cited by examiner

| CURRENT RANGE | RANGE OF SOC | | | | |
|---|---|---|---|---|---|
| | NOT LESS THAN 0% AND LESS THAN 15% | NOT LESS THAN 15% AND LESS THAN 30% | NOT LESS THAN 30% AND LESS THAN 70% | NOT LESS THAN 70% AND LESS THAN 85% | NOT LESS THAN 85% AND NOT MORE THAN 100% |
| LESS THAN A1 | X1 | X2 | X3 | X4 | X5 |
| NOT LESS THAN A1 AND LESS THAN A2 | X6 | X7 | X8 | X9 | X10 |
| NOT LESS THAN A2 AND LESS THAN A3 | X11 | X12 | X13 | X14 | X15 |
| NOT LESS THAN A3 AND LESS THAN A4 | X16 | X17 | X18 | X19 | X20 |
| NOT LESS THAN A4 | X21 | X22 | X23 | X24 | X25 |

(UNIT: hour)

FIG.6

| TEMPERATURE RANGE | RANGE OF SOC | | | | | |
|---|---|---|---|---|---|---|
| | NOT LESS THAN 0% AND LESS THAN 15% | NOT LESS THAN 15% AND LESS THAN 30% | NOT LESS THAN 30% AND LESS THAN 70% | NOT LESS THAN 70% AND LESS THAN 85% | NOT LESS THAN 85% AND NOT MORE THAN 100% | |
| LESS THAN B1 | Y1 | Y2 | Y3 | Y4 | Y5 | |
| NOT LESS THAN B1 AND LESS THAN B2 | Y6 | Y7 | Y8 | Y9 | Y10 | |
| NOT LESS THAN B2 AND LESS THAN B3 | Y11 | Y12 | Y13 | Y14 | Y15 | |
| NOT LESS THAN B3 AND LESS THAN B4 | Y16 | Y17 | Y18 | Y19 | Y20 | |
| NOT LESS THAN B4 AND LESS THAN B5 | Y21 | Y22 | Y23 | Y24 | Y25 | |
| NOT LESS THAN B5 | Y26 | Y27 | Y28 | Y29 | Y30 | |

(UNIT: hour)

FIG.7

| BATTERY ID | VEHICLE BODY ID (TYPE OF VEHICLE) | USER ID | UTILIZED TYPE OF INDUSTRY | STATE HISTORY INFORMATION | DETECTION PERIOD OF ORIGINAL DATA (BATTERY STATE INFORMATION) | BATTERY USE TIME | TRANSMISSION DATE AND TIME | POSITION ID |
|---|---|---|---|---|---|---|---|---|
| | | | | | | | | |

FIG.8

| RANGE OF SOC | NOT LESS THAN 0% AND LESS THAN 15% | NOT LESS THAN 15% AND LESS THAN 30% | NOT LESS THAN 30% AND LESS THAN 70% | NOT LESS THAN 70% AND LESS THAN 85% | NOT LESS THAN 85% AND NOT MORE THAN 100% |
|---|---|---|---|---|---|
| FREQUENCY | $\alpha 1$ | $\alpha 2$ | $\alpha 3$ | $\alpha 4$ | $\alpha 5$ |

FIG.10

| CURRENT RANGE | LESS THAN A1 | NOT LESS THAN A1 AND LESS THAN A2 | NOT LESS THAN A2 AND LESS THAN A3 | NOT LESS THAN A3 AND LESS THAN A4 | NOT LESS THAN A4 |
|---|---|---|---|---|---|
| FREQUENCY | $\beta 1$ | $\beta 2$ | $\beta 3$ | $\beta 4$ | $\beta 5$ |

FIG.11

| TEMPERATURE RANGE | LESS THAN B1 | NOT LESS THAN B1 AND LESS THAN B2 | NOT LESS THAN B2 AND LESS THAN B3 | NOT LESS THAN B3 AND LESS THAN B4 | NOT LESS THAN B4 AND LESS THAN B5 | NOT LESS THAN B5 |
|---|---|---|---|---|---|---|
| FREQUENCY | $\gamma 1$ | $\gamma 2$ | $\gamma 3$ | $\gamma 4$ | $\gamma 5$ | $\gamma 6$ |

FIG.12

| MODE | HEV (eco) | HEV (sport) | EV | BOOST | WALK | PROTECT |
|---|---|---|---|---|---|---|
| FREQUENCY | $\delta 1$ | $\delta 2$ | $\delta 3$ | $\delta 4$ | $\delta 5$ | $\delta 6$ |

FIG.13

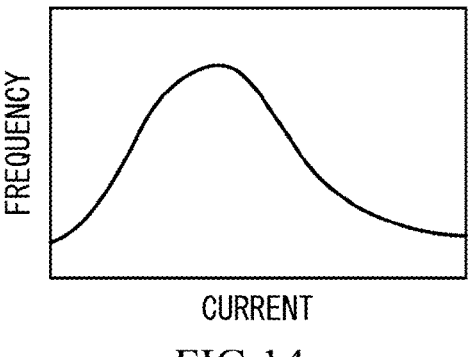

FIG.14

BATTERY MANAGEMENT METHOD, STORAGE MEDIUM, STORAGE CONTROLLER, AND MOVABLE BODY

CROSS-REFERENCE TO RELATED APPLICATION

This application claims priority to and the benefit of Japanese Patent Application No. 2022-146359, filed on Sep. 14, 2022, the entire disclosure of which is incorporated herein by reference.

BACKGROUND OF THE INVENTION

Field of the Invention

The present disclosure relates to a battery management method, a storage medium, a storage controller, and a movable body.

Description of the Related Art

Japanese Patent No. 5,898,778 discloses an electric vehicle on which a battery pack (battery unit) including a battery is mounted. The battery pack includes a battery monitoring device that monitors the state of the battery.

Since time-series data indicating the state of the battery increases with time, a large capacity memory is required.

SUMMARY OF THE INVENTION

An object of the present disclosure is to provide a battery management method, a storage medium, a storage controller, and a movable body each of which can prevent an increase in a memory capacity for storing the state of a battery.

A battery management method according to one aspect of the present disclosure includes: detecting information by at least one sensor, the information being related to a state of a battery mounted on a vehicle body; classifying the state of the battery into any one of predetermined state categories based on the information detected by the at least one sensor; and storing in a memory a frequency of occurrence of the state of the battery corresponding to the state category.

A storage medium according to one aspect of the present disclosure is a computer-readable storage medium storing a battery management program for managing a battery mounted on a vehicle body, the battery management program causing a computer to execute: classifying a state of the battery into any one of predetermined state categories based on information which is detected by at least one sensor and related to the state of the battery; and storing a frequency of occurrence of the state of the battery corresponding to the state category.

A storage controller according to one aspect of the present disclosure includes: an interface that receives information related to a state of a battery mounted on a vehicle body; a memory; and processing circuitry. The processing circuitry classifies the state of the battery into any one of predetermined state categories based on the received information. The processing circuitry stores in a memory a frequency of occurrence of the state of the battery corresponding to the state category.

A movable body according to one aspect of the present disclosure includes: a vehicle body; at least one sensor that detects information related to a state of a battery mounted on the vehicle body; a memory; and processing circuitry that classifies the state of the battery into any one of predetermined state categories based on the information detected by the at least one sensor and stores in the memory a frequency of occurrence of the state of the battery corresponding to the state category.

BRIEF DESCRIPTION OF DRAWINGS

FIG. 6 is a table showing one example of frequencies of state categories defined by the discharge currents of a battery and the states of charge of the battery.

FIG. 7 is a table showing one example of the frequencies of the state categories defined by the temperatures of the battery and the states of charge of the battery.

FIG. 8 is a diagram showing a configuration example of data transmitted from a vehicle body-side electronic device to the server.

FIG. 10 is a table showing one example of the frequencies of the state categories defined by the states of charge of the battery.

FIG. 11 is a table showing one example of the frequencies of the state categories defined by the discharge currents of the battery.

FIG. 12 is a table showing one example of the frequencies of the state categories defined by the temperatures of the battery.

FIG. 13 is a table showing one example of the frequencies of the state categories defined by use modes.

FIG. 14 shows another example of the histogram showing the frequencies of the state categories.

DETAILED DESCRIPTION OF PREFERRED EMBODIMENTS

Hereinafter, an embodiment will be described with reference to the drawings.

Outline of System

Figure 1:
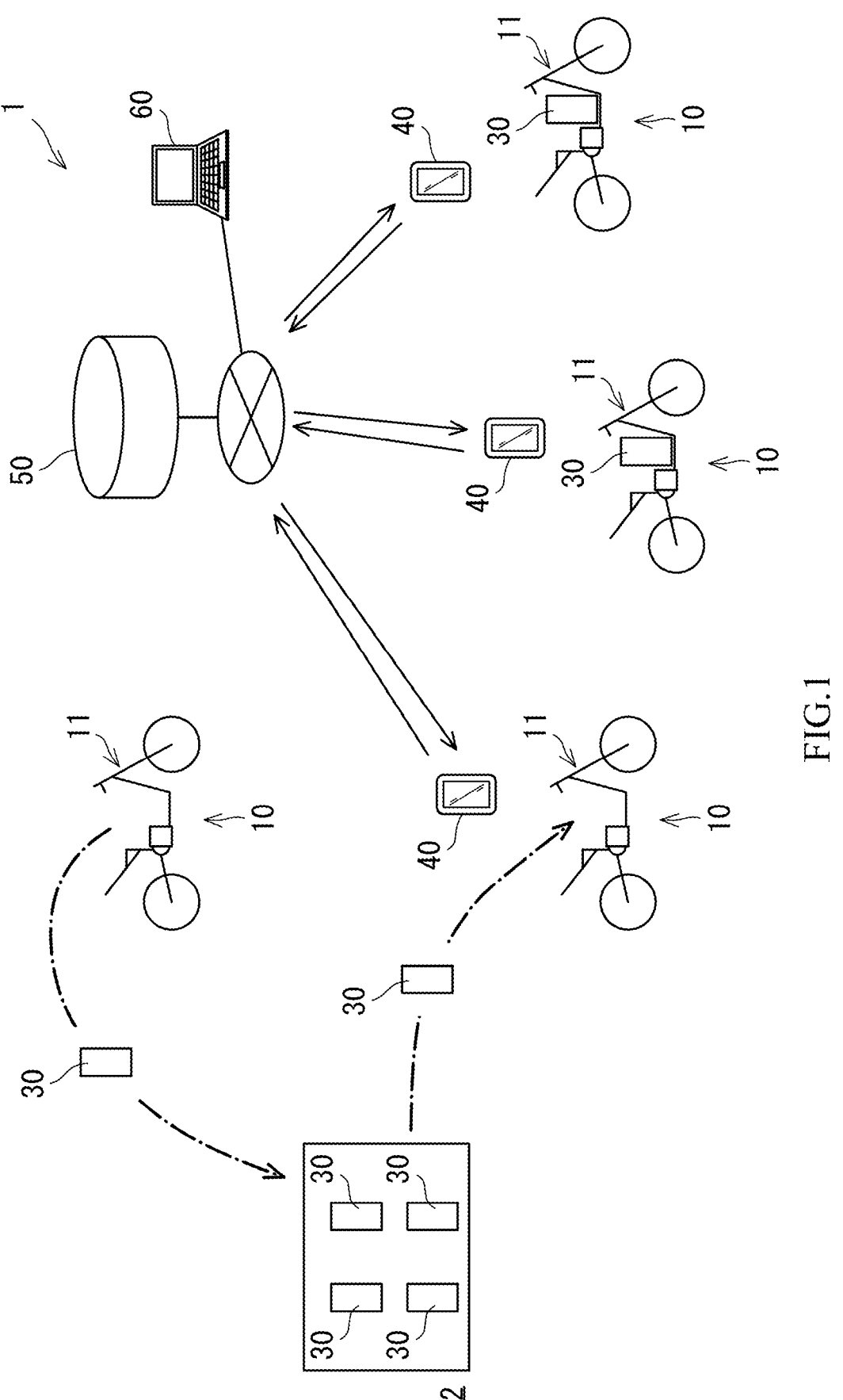
FIG. 1 is a schematic diagram showing a schematic configuration of a battery management system that executes a battery management method according to one embodiment.

FIG. 1 is a schematic diagram showing a schematic configuration of a battery management system 1 that executes a battery management method according to one embodiment. The battery management system 1 is a system that manages, in a server 50, battery packs 30 detachably mounted on respective vehicle bodies 11 of movable bodies 10. In the present embodiment, an electric motorcycle 10 will be described as one example of the movable body 10.

The electric motorcycle 10 includes a vehicle body 11 and a battery pack 30. The battery pack 30 is detachably mounted to the vehicle body 11.

In the present embodiment, the battery pack 30 may be attached to and detached from various vehicle bodies 11. For example, in the battery management system 1, when a battery remaining amount of the battery pack 30 mounted on the electric motorcycle 10 that is traveling becomes small, a user of the vehicle body 11 can replace this battery pack 30 with a charged battery pack 30 at, for example, a predetermined battery pack station 2.

In the battery management system 1 of the present embodiment, the use histories of the battery packs 30 are stored in the server 50. Specifically, state history information indicating the history of the state of the battery pack 30 mounted on the vehicle body 11 is once stored in a memory 19*b* (see FIG. 3) of an electronic device of the vehicle body 11. After that, when the electronic device of the vehicle body 11 and a mobile terminal 40 of the user are communicably connected to each other, various pieces of information including the state history information are transmitted from the electric motorcycle 10 through the mobile terminal 40 to the server 50. In the server 50, the received state history information is associated with battery identification information and stored. For example, the state history information stored in the server 50 is utilized to analyze the state of the battery pack and grasp a use tendency of the battery pack. For example, the information stored in the server 50 is accessible from an information terminal device 60 outside the server 50 through the Internet or the like. Hereinafter, components of the battery management system 1 will be described in order.

Electric Motorcycle

Figure 2:
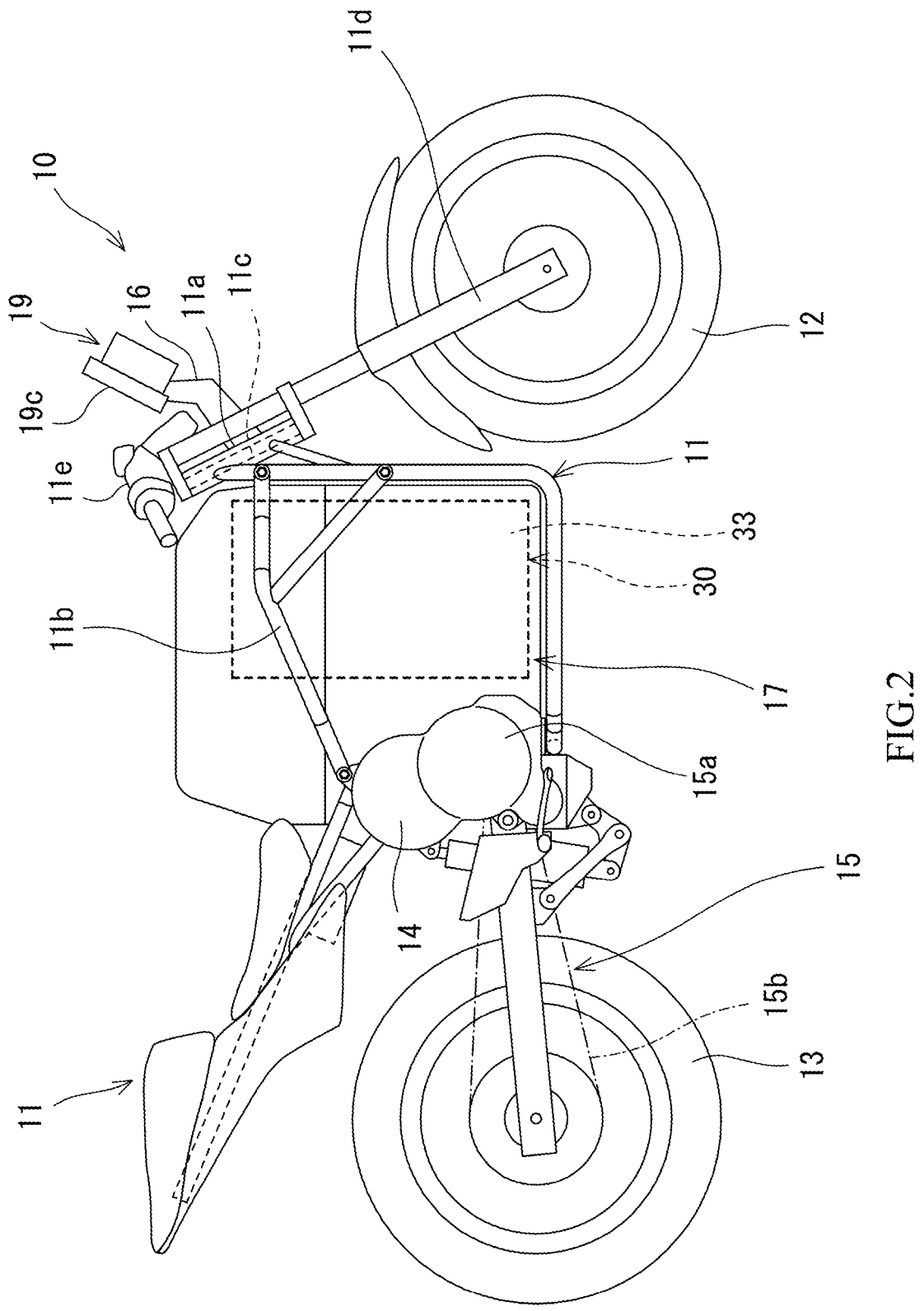
FIG. 2 is one example of a right side view of an electric motorcycle of FIG. 1.

FIG. 2 is one example of a right side view of the electric motorcycle 10 shown in FIG. 1. As shown in FIG. 2, the electric motorcycle 10 includes the vehicle body 11 and the battery pack 30. The battery pack 30 is attachable to and detachable from the vehicle body 11.

The vehicle body 11 is supported by a front wheel 12 as a driven wheel and a rear wheel 13 as a driving wheel. An electric motor 14 as a traveling driving source is supported by the vehicle body 11. The electric motor 14 generates traveling driving power to be transmitted to the rear wheel 13 as the driving wheel. The traveling driving power generated by the electric motor 14 is transmitted to the rear wheel 13 through a power transmission mechanism 15. The power transmission mechanism 15 includes: a transmission 15*a* that changes the speed of the rotation of the electric motor 14; and a mechanism 15*b* (for example, a chain drive mechanism or a belt drive mechanism) by which rotational power output from the transmission 15*a* is transmitted to an axle of the rear wheel 13.

The vehicle body 11 includes a vehicle body frame. The vehicle body frame includes a head pipe 11*a* and a pair of left and right main frames 11*b* extending rearward from the head pipe 11*a*. The head pipe 11*a* rotatably supports a steering shaft 11*c*. A front fork 11*d* extending in a substantially upper-lower direction is connected to the steering shaft 11*c*. The front wheel 12 is rotatably supported by a lower end portion of the front fork 11*d*. A bar-shaped handle 11*e* extending in a left-right direction is connected to an upper end portion of the steering shaft 11*c*. A right grip of the handle 11*e* is an accelerator grip that adjusts the traveling driving power generated by the electric motor 14. When the accelerator grip is rotated, an operation amount of the accelerator grip is detected by an accelerator sensor 18 (see FIG. 3).

A meter device 19 is located in front of the handle 11*e*. The meter device 19 includes a display 19*c* that displays a traveling speed, a motor rotational frequency, a battery remaining amount, and the like. The meter device 19 is supported by the head pipe 11*a* through a bracket 16.

The vehicle body 11 includes a battery accommodating space accommodating the battery pack 30. The battery accommodating space is located, for example, between the pair of main frames 11*b* in the left-right direction. Specifically, a battery case 17 including the battery accommodating space is located between the pair of main frames 11*b* in the left-right direction and fixed to the pair of main frames 11*b*. By moving the battery pack 30 relative to the battery case 17 in, for example, the upper-lower direction, the battery pack 30 can be inserted into the battery accommodating space from above the battery case 17 or can be pulled out from the battery accommodating space.

Figure 3:
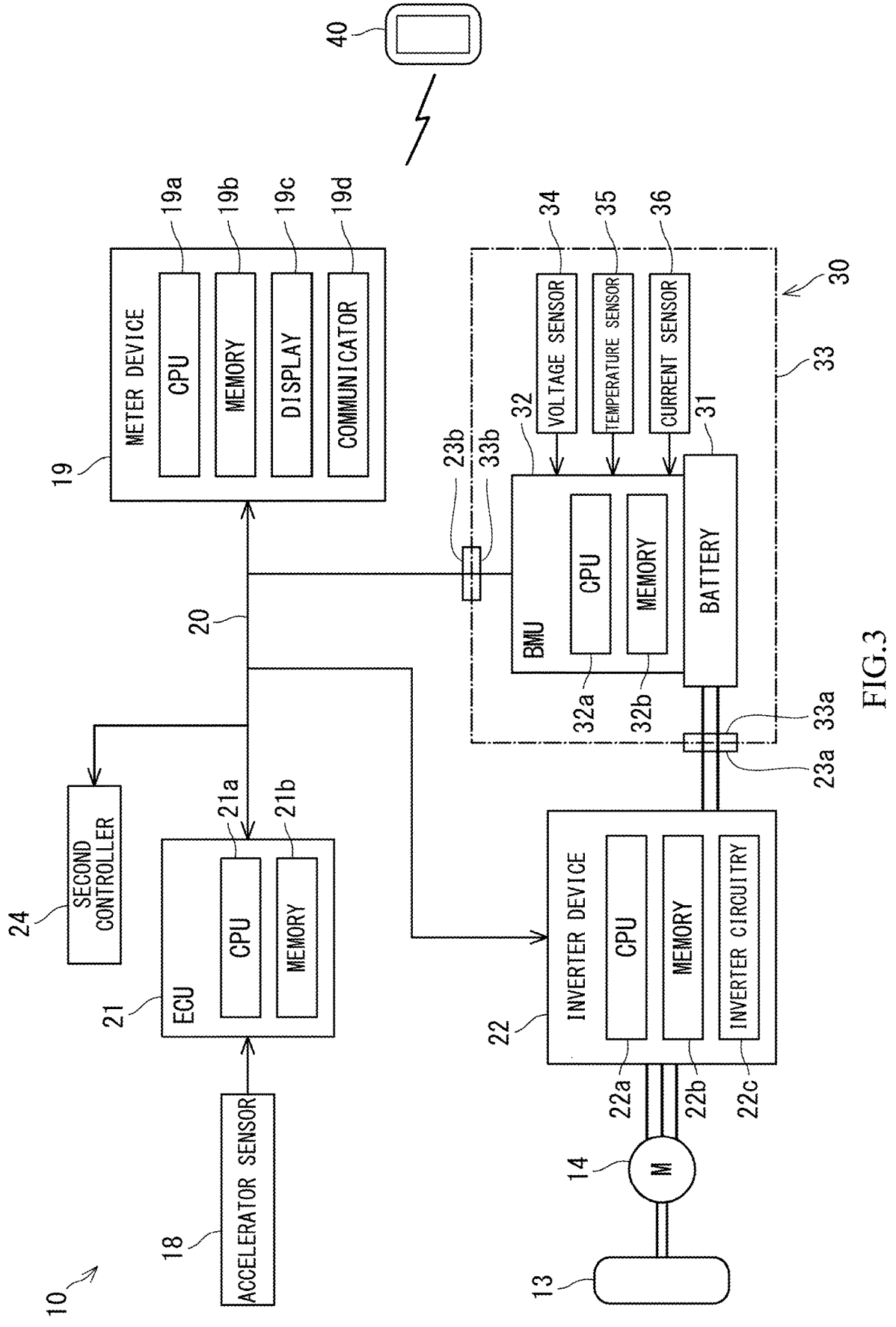
FIG. 3 is a block diagram showing one example of an electric system of the electric motorcycle of FIG. 1.

FIG. 3 is a block diagram showing one example of an electric system of the electric motorcycle 10 shown in FIG. 1. In addition to the above-described meter device 19, a vehicle controller (Electronic Control Unit; hereinafter referred to as an ECU) 21 and an inverter device 22 are fixed to the vehicle body 11 of the electric motorcycle 10. The meter device 19, the ECU 21, the inverter device 22 are communicably connected to each other through a CAN (Controller Area Network) 20. Moreover, as described below, with the battery pack 30 accommodated in the battery accommodating space, devices incorporated in the battery pack 30 are electrically connected to the meter device 19, the ECU 21, the inverter device 22, and the like of the vehicle body 11.

The meter device 19 displays the traveling speed, the motor rotational frequency, the battery remaining amount, and the like. The meter device 19 includes a CPU (Central Processing Unit) 19*a*, the memory 19*b*, the display 19*c*, and a communicator 19*d*. These components 19*a*, 19*b*, 19*c*, and 19*d* are communicably connected to each other. The CPU 19*a* controls the operations of the meter device 19. The memory 19*b* stores various programs and data necessary for the operations of the meter device 19. For example, the memory 19*b* stores a battery management program including commands for executing the below-described battery management method. The memory 19*b* does not have to be a single storage device and may include storage devices. For example, the memory 19*b* may include one of plural types of storage devices, such as a RAM, a ROM, a hard disk, and a flash memory, or may include a combination of two or more of those. For example, various operations of the meter device 19 are realized in such a manner that the CPU 19*a* executes the programs stored in the memory 19*b*.

Moreover, as described below, the state history information indicating the history of the state of the battery pack 30 is stored as rewritable data in the memory 19*b*. The CPU 19*a* updates and stores the state history information, stored in the memory 19*b*, based on below-described battery state information received by the meter device 19.

Based on the data received through the CAN 20, the CPU 19*a* displays the traveling speed, the motor rotational frequency, the battery remaining amount, and the like on the display 19*c* of the meter device 19. In the present embodiment, the display 19*c* is a liquid crystal display that displays, for example, the traveling speed, the motor rotational frequency, the battery remaining amount, and the like in a digital format. However, instead of or in addition to the liquid crystal display, the meter device 19 may include, as the display 19*c*, an instrument that displays the traveling speed and the like in an analog format.

The communicator 19*d* is a module including communication circuitry that performs wireless communication with the mobile terminal 40. For example, the communicator 19*d* includes an antenna, RF (Radio Frequency) circuitry, and the like. In the present embodiment, the wireless communication between the communicator 19*d* and a first communicator 44 of the mobile terminal 40 communicating with the communicator 19*d* is near field communication, such as Bluetooth (trademark) communication, and is realized by pairing. The communicator 19*d* and the first communicator 44 may perform wired communication. The communicator 19*d* may have a function of being able to communicate with the server through a public wireless network, without through the mobile terminal 40.

Each of the CPU 19*a*, the communicator 19*d*, and the like in the meter device 19 is one example of processing circuitry. The memory 19*b* is one example of a vehicle body-side memory. The meter device 19 is one example of a storage controller.

The ECU 21 is a control unit that determines the traveling driving power of the electric motorcycle 10 in accordance with an operation command generated by the operation of the user and the state of the vehicle. The ECU 21 controls the inverter device 22 in accordance with the operation command generated by the operation of the user and the state of the vehicle to execute traveling control corresponding to a user's request and the state of the vehicle. For example, the ECU 21 receives an accelerator operation amount detected by the accelerator sensor 18 and generates a rotational frequency command of the electric motor 14 based on the received signal. The ECU 21 transmits the rotational frequency command to the inverter device 22 through the CAN 20 to control a switching operation of the inverter device 22.

The ECU 21 includes a CPU 21*a* and a memory 21*b*. The CPU 21*a* and the memory 21*b* are communicably connected to each other. The CPU 21*a* controls the operations of the ECU 21. The memory 21*b* stores various programs and data necessary for the operations of the ECU 21. The memory 21*b* does not have to be a single storage device and may include storage devices. For example, the memory 21*b* may include one of plural types of storage devices, such as a RAM, a ROM, a hard disk, and a flash memory, or may include a combination of two or more of those. For example, various operations of the ECU 21 are realized in such a manner that the CPU 21*a* executes the programs stored in the memory 21*b*.

The inverter device 22 is electrically connected to a battery 31 of the battery pack 30 accommodated in the battery accommodating space. The inverter device 22 converts DC power, discharged from the battery pack 30, into AC power. The inverter device 22 adjusts an output voltage and an output frequency based on the command received from the ECU 21. The electric power output from the inverter device 22 is transmitted to the electric motor 14, and the electric motor 14 operates by the AC power from the inverter device 22 to generate the traveling driving power.

The inverter device 22 includes a CPU 22*a*, a memory 22*b*, and inverter circuitry 22*c*. The CPU 22*a* controls the operation of the inverter device 22. To be specific, the CPU 22*a* functions as part of control circuitry that controls the switching operation of the inverter circuitry 22*c*. The memory 22*b* stores various programs and data necessary for the operation of the inverter device 22. The memory 22*b* does not have to be a single storage device and may include storage devices. For example, the memory 19*b* may include one of plural types of storage devices, such as a RAM, a ROM, a hard disk, and a flash memory, or may include a combination of two or more of those. Various operations of the inverter device 22 are realized in such a manner that, for example, the CPU 22*a* executes the programs stored in the memory 22*b*.

Moreover, one or more second controllers 24 other than the ECU 21 are fixed to the vehicle body 11. In FIG. 3, for simplicity, one or more second controllers 24 are shown by a single block. One or more second controllers 24 are connected to the CAN 20. To be specific, one or more second controllers 24 are communicable with the meter device 19, the ECU 21, the inverter device 22, and the battery pack 30 accommodated in the battery accommodating space through the CAN 20.

Examples of control performed by one or more second controllers 24 include auto cruise control, traction control, ABS control, suspension control, steering control, and cornering light. The cornering light is a function of automatically irradiating a far side in a turning direction with light when the electric motorcycle 10 turns. Moreover, when the electric motorcycle 10 includes a sensor (such as a laser radar, a millimeter wave radar, an ultrasonic sensor, or a camera) which detects an obstacle or an object existing around the electric motorcycle 10, the second controller 24 may be a device that controls the sensor. Each second controller 24 includes: a memory that stores various programs and data; and a CPU that executes the programs stored in the memory.

The battery pack 30 includes the battery 31, a battery management unit (BMU) 32, a casing 33, a voltage sensor 34, a temperature sensor 35, and a current sensor 36. The battery 31, the battery management unit 32, the voltage sensor 34, the temperature sensor 35, and the current sensor 36 are accommodated in the casing 33. With the battery pack 30 accommodated in the battery accommodating space, the battery 31 and the battery management unit 32 of the battery pack 30 are electrically connected to the devices of the vehicle body 11.

Specifically, the casing 33 of the battery pack 30 includes a battery-side power supply connector 33*a*. The battery-side power supply connector 33*a* is electrically connected to the battery 31. Moreover, a vehicle body-side power supply connector 23*a* is fixed to the vehicle body 11. The vehicle body-side power supply connector 23*a* is electrically connected to the inverter device 22. For example, the vehicle body-side power supply connector 23*a* is part of the battery case 17. With the battery pack 30 accommodated in the battery accommodating space, the battery-side power supply connector 33*a* is mechanically and electrically connected to the vehicle body-side power supply connector 23*a*. Thus, driving electric power for driving the electric motor 14 (which may also be referred to as a drive motor) can be supplied from the battery 31 to the inverter device 22.

Moreover, the casing 33 of the battery pack 30 includes a battery-side communication connector 33*b*. The battery-side communication connector 33*b* is electrically connected to the battery management unit 32. Moreover, a vehicle body-side communication connector 23*b* is fixed to the vehicle body 11. The vehicle body-side communication connector 23*b* is connected to the CAN 20. For example, the vehicle body-side communication connector 23*b* is part of the battery case 17. With the battery pack 30 accommodated in the battery accommodating space, the battery-side communication connector 33*b* is mechanically and electrically connected to the vehicle body-side communication connector 23*b*. Thus, the battery management unit 32 is communicable with various vehicle body-side electronic devices, such as the meter device 19, the ECU 21, and the inverter device 22, through the CAN 20. To be specific, the CAN 20 and the vehicle body-side communication connector 23*b* are part of a communication interface that is communicable with the battery pack 30 mounted on the vehicle body 11.

The battery 31 includes battery cells connected in series.

The battery management unit 32 includes a CPU 32*a* and a memory 32*b*. The CPU 32*a* controls the operations of the battery management unit 32. The memory 32b stores various programs and data necessary for the operations of the battery management unit 32. The memory 32b does not have to be a single storage device and may include storage devices. For example, the memory 32b may include one of plural types of storage devices, such as a RAM, a ROM, a hard disk, and a flash memory, or may include a combination of two or more of those. The memory 32b includes, for example, a RAM, a ROM, a hard disk, or a flash memory. Various operations of the battery management unit 32 are realized in such a manner that, for example, the CPU 32a executes the programs stored in the memory 32b.

The memory 32b stores the battery identification information for identifying the battery pack 30 (i.e., for identifying the battery 31).

The battery management unit 32 is electrically connected to the voltage sensor 34, the temperature sensor 35, and the current sensor 36. The voltage sensor 34 detects voltage values of the battery cells of the battery 31. The temperature sensor 35 detects the temperature of the battery 31. The current sensor 36 detects a charge current supplied to the battery 31 and a discharge current discharged from the battery 31. The battery management unit 32 monitors the state of the battery 31 based on information detected by the voltage sensor 34, the temperature sensor 35, and the current sensor 36.

For example, the battery management unit 32 estimates the amount of electricity stored in the battery 31, i.e., the state of charge (SOC) of the battery 31. The battery management unit 32 estimates the state of charge of the battery 31 from, for example, the voltage values of the battery cells detected by the voltage sensor 34 and the amounts of charge current and discharge current detected by the current sensor 36. To be specific, the battery management unit 32 functions as one of sensors that detect information related to the state of the battery 31 mounted on the vehicle body 11.

For example, the battery management unit 32 determines from the detected value of the temperature sensor 35 whether or not the temperature of the battery 31 falls within a normal range.

For example, the battery management unit 32 determines from the detected value of the current sensor 36 whether or not the discharge current of the battery 31 falls within a normal range.

The state of charge of the battery 31, the temperature of the battery 31, and the discharge current of the battery 31 are included in the battery state information indicating the states of the battery 31. The battery state information is output from the battery management unit 32 to the CAN 20 together with the battery identification information at all times (at predetermined time intervals). Thus, as described below, the battery state information output to the CAN 20 is used to generate the state history information stored in the storage device (in the present embodiment, the memory 19b of the meter device 19) of the vehicle body 11.

Mobile Terminal

Figure 4:
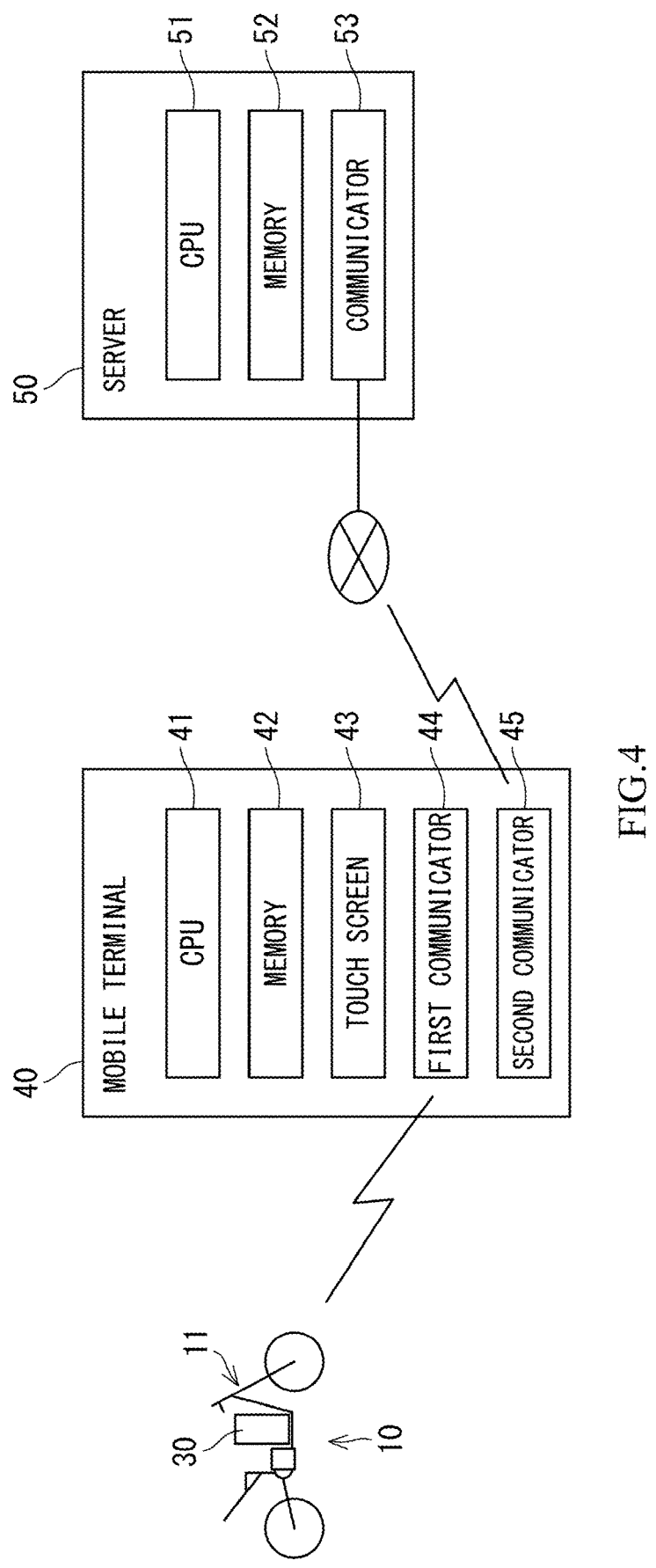
FIG. 4 is a block diagram showing the configurations of a mobile terminal and a server which are shown in FIG. 1.

FIG. 4 is a block diagram showing the configurations of the mobile terminal 40 and the server 50 which are shown in FIG. 1. The mobile terminal 40 is an information communication terminal that is communicable with the electric motorcycle 10 and the server 50. One example of the mobile terminal 40 is a smartphone carried by a user. The mobile terminal 40 includes a CPU 41, a memory 42, a touch screen 43, the first communicator 44, and a second communicator 45. These components 41, 42, 43, 44, and 45 are communicably connected to each other.

The CPU 41 controls the operations of the mobile terminal 40. The memory 42 stores various programs and data necessary for the operations of the mobile terminal 40. The memory 42 does not have to be a single storage device and may include storage devices. For example, the memory 42 may include one of plural types of storage devices, such as a RAM, a ROM, and a flash memory, or may include a combination of two or more of those. Various operations of the mobile terminal 40 are realized in such a manner that, for example, the CPU 41 executes the programs stored in the memory 42.

The touch screen 43 serves as both an inputter that receives an operation input from a user and a display that displays a screen image visually confirmable by the user. Specifically, the touch screen 43 includes: a transflective display and a backlight LED (display); and a touch panel (inputter) located on the display. The inputter and display of the mobile terminal 40 may not be integrated with each other, i.e., may be separated from each other.

The first communicator 44 is a module including communication circuitry that performs wireless communication with the electric motorcycle 10. Since the first communicator 44 is the same in configuration as the communicator 19d, an explanation thereof is omitted.

The second communicator 45 is a module including communication circuitry that is connected to the Internet. For example, the second communicator 45 is a wireless LAN module. For example, the second communicator 45 is connected to the Internet through a public wireless network. The second communicator 45 communicates with the server 50 through the Internet.

Server

The server 50 includes a CPU 51, a memory 52, and a communicator 53. These components 51, 52, and 53 are communicably connected to each other.

The CPU 51 controls the operations of the server 50. The memory 52 stores various programs and data necessary for the operations of the server 50. The memory 52 does not have to be a single storage device and may include storage devices. For example, the memory 52 may include one of plural types of storage devices, such as a RAM, a ROM, a hard disk, and a flash memory, or may include a combination of two or more of those. Various operations of the server 50 are realized in such a manner that, for example, the CPU 51 executes the programs stored in the memory 52.

The communicator 53 is a module including communication circuitry that is connected to the Internet. For example, the communicator 53 is a wireless LAN module, a LAN module, or the like. Information received through the communicator 53 is stored in the memory 52. The communicator 53 communicates with the mobile terminal 40 of the user of the electric motorcycle 10 through the Internet.

Battery Management Method

Figure 5:
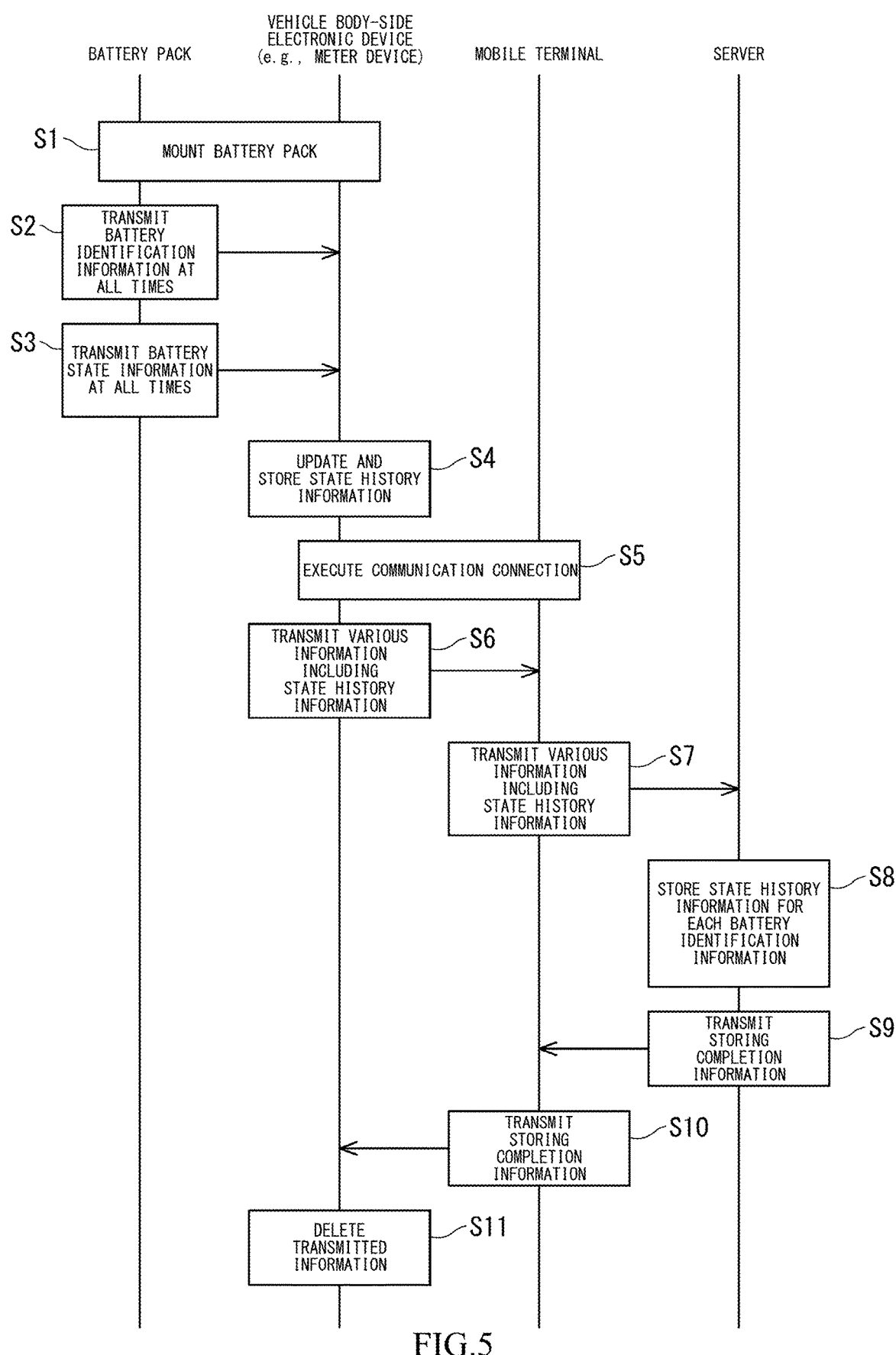
FIG. 5 is a flowchart showing the flow of the battery management method executed by the battery management system of FIG. 1.

FIG. 5 is a flowchart showing the flow of the battery management method executed by the battery management system 1. When the battery pack 30 is mounted on the vehicle body 11, the battery management unit 32 and the devices, such as the meter device 19, of the vehicle body 11 are electrically connected to each other through the CAN 20 (Step S1). To be specific, the battery management unit 32 and the meter device 19 are set to be communicable with each other. In addition, electric power can be supplied from the battery 31 through the inverter device 22 to the electric motor 14.

While the electric power is supplied from the battery 31 to the electric motor 14, the battery management unit 32 outputs the battery identification information and the battery state information, which are stored in the memory 32*b*, to the CAN 20 at all times (Steps S2 and S3). Specifically, when a main switch (which may also be referred to as a power switch or an ignition switch) that sets the electric motorcycle 10 to a travelable state is in an on state, the battery identification information and the battery state information are continuously output from the battery pack 30 to the CAN 20. When the main switch is in an off state, the battery identification information and the battery state information are not output from the battery pack 30 to the CAN 20.

The meter device 19 receives the battery identification information and the battery state information which are output from the battery management unit 32. In the meter device 19, the CPU 19*a* generates, from the received battery state information, the state history information which is smaller in the amount of data than the battery state information and indicates the history of the state of the battery 31 while the battery 31 is mounted on the vehicle body 11. Then, the CPU 19*a* stores the generated state history information in the memory 19*b* (Step S4). The state history information is associated with the battery identification information and stored in the memory 19*b*.

Until the timing of the communication connection in Step S5 described below, the state history information is continuously updated and stored. Moreover, even when the supply of the electric power to the memory 19*b* stops before Step S5 described below (i.e., even when the main switch is turned off), the state history information stored in the memory 19*b* is maintained in the memory 19*b*.

Storing the state history information in Step S4 will be specifically described. As described above, the battery state information detected by the BMU 32, the voltage sensor 34, the temperature sensor 35, the current sensor 36, and the like is continuously output at all times. Storing all pieces of output information in the memory 19*b*, i.e., continuously storing time-series data of the battery state information in the memory 19*b* leads to the excessive use of the capacity of the memory 19*b*.

Then, in the present embodiment, in the meter device 19, the CPU 19*a* classifies the states of the battery into predetermined state categories based on the battery state information received from the battery pack 30. Then, the CPU 19*a* stores in the memory 19*b*, frequencies of the occurrence of the states of the battery 31 corresponding to the state categories. A method of storing the state history information as frequency information will be described in detail with reference to FIGS. 6 and 7.

FIG. 6 is a table showing one example of the frequencies of the state categories defined by the discharge currents of the battery 31 and the states of charge (SOC) of the battery 31. Based on the state of charge of the battery 31 and the discharge current of the battery 31 which are included in the received battery state information, the CPU 19*a* of the meter device 19 classifies the state of the battery 31 corresponding to the received battery state information into any one of the state categories.

As the ranges of the discharge current, the example of FIG. 6 shows five ranges that are a range of less than A1, a range of not less than A1 and less than A2, a range of not less than A2 and less than A3, a range of not less than A3 and less than A4, and a range of not less than A4. Moreover, as the ranges of the state of charge, the example of FIG. 6 shows five ranges that are a range or not less than 0% and less than 15%, a range of not less than 15% and less than 30%, a range of not less than 30% and less than 70%, a range of not less than 70% and less than 85%, and a range of not less than 85% and not more than 100%. To be specific, each combination of the discharge current of the battery 31 and the state of charge (SOC) of the battery 31 is classified into any one of 25 (five times five) state categories.

After such combination is classified into the state category, as the frequency of the occurrence of the state of the battery 31 corresponding to this state category, the CPU 19*a* stores in the memory 19*b* a time (hereinafter also referred to as a category use time) in which the battery 31 has been used in the state corresponding to this state category. In the table of FIG. 6, the unit of values (X1 to X25) shown in boxes corresponding to the state categories is a time (hour).

Specifically, the category use times corresponding to the 25 state categories are associated with the battery identification information and stored in the memory 19*b*. Based on the received battery state information, the CPU 19*a* counts the frequency (in the present embodiment, the time) of the state category and updates the category use time which is stored in the memory 19*b* and corresponds to the state category. One example assumes that the state of charge of the battery 31 is not less than 85% and not more than 100%, and the current in the range of not less than A2 and less than A3 is continuously discharged from the battery 31 for an hour. In this case, an hour is added to the category use time of the state category defined by the state of charge in the range of not less than 85% and not more than 100% and the discharge current in the range of not less than A2 and less than A3.

Moreover, FIG. 7 is a table showing one example of the frequencies of the state categories defined by the temperatures of the battery 31 and the states of charge (SOC) of the battery 31. Based on the state of charge of the battery 31 and the temperature of the battery 31 which are included in the received battery state information, the CPU 19*a* of the meter device 19 classifies the state of the battery 31 corresponding to the received battery state information into any one of the state categories which are different in type from the state categories shown in FIG. 6.

As the ranges of the temperature of the battery 31, the example of FIG. 7 shows six ranges that are a range of less than B1, a range of not less than B1 and less than B2, a range of not less than B2 and less than B3, a range of not less than B3 and less than B4, a range of not less than B4 and less than B5, and a range of not less than B5. Moreover, as the ranges of the state of charge, the example of FIG. 7 shows five ranges that are a range of not less than 0% and less than 15%, a range of not less than 15% and less than 30%, a range of not less than 30% and less than 70%, a range of not less than 70% and less than 85%, and a range of not less than 85% and not more than 100%. To be specific, each combination of the temperature of the battery 31 and the state of charge (SOC) of the battery 31 is classified into any one of 30 (six times five) state categories.

After such combination is classified into the state category, as the frequency of the occurrence of the state of the battery 31 corresponding to this state category, the CPU 19*a* stores the category use time in the memory 19*b*. In the table of FIG. 7, as with FIG. 6, the unit of values (Y1 to Y30) shown in boxes corresponding to the state categories is a time (hour).

Specifically, the category use times corresponding to the 30 state categories are associated with the battery identification information and stored in the memory 19*b*. Based on the received battery state information, the CPU 19*a* counts the frequency (in the present embodiment, the time) of the state category and updates the category use time which is stored in the memory 19*b* and corresponds to the state category. One example assumes that the state of charge of the battery 31 is not less than 85% and not more than 100%, and the temperature of the battery 31 in the range of not less than B3 and less than B4 is continued for an hour. In this case, an hour is added to the category use time of the state category defined by the state of charge in the range of not less than 85% and not more than 100% and the temperature of the battery 31 in the range of not less than B3 and less than B4.

As above, the state history information indicating the history of the state of the battery 31 is stored as information indicating the accumulation of the frequency (in the present embodiment, the time) of the predetermined state of the battery 31. Therefore, the history of the state of the battery 31 can be stored as information whose amount of data is small.

In the examples shown in FIGS. 6 and 7, the widths of the ranges of the state of charge in the state categories are not the same as each other. To be specific, the width of the range in which the state of charge is not less than 30% and less than 70% is about 40%, but each of the widths of the other ranges is about 15%. To be specific, the width of the range of the state of charge in the category in which the state of charge is close to 0% or 100% is relatively small. As above, the range of information related to the state of the battery 31 (in other words, the range of a sensor detected value) is changed depending on the state category. This is to facilitate the evaluation of the deterioration state of the battery.

More specifically, as a result of diligent studies, system constructors of the battery management system 1 have found that the state of charge of the battery 31, the discharge current of the battery 31, and the temperature of the battery 31 are especially useful information to grasp the deterioration of the battery 31. Moreover, the system constructors have found that the deterioration of the battery 31 accelerates when a state where the state of charge is close to 100% or 0% continues for a long period of time. Furthermore, the system constructors have found that the deterioration of the battery further accelerates when the battery 31 whose temperature is different from normal temperature is used in a state where the state of charge is close to 100% or 0%, or when the discharge current of the battery 31 is large in a state where the state of charge is close to 100% or 0%. For example, the deterioration of the battery hardly occurs in the range including the state of the battery 31 in which the state of charge is 50%, i.e., in the range in which the state of charge is not less than 30% and less than 70% in the present embodiment, as compared to the other ranges. Then, by subdividing the range in which the deterioration of the battery 31 tends to occur, the evaluation of the deterioration state of the battery is facilitated. In other words, by increasing the amount of information in the range that tends to influence the deterioration, the evaluation of the deterioration state of the battery is facilitated.

For example, the range of the discharge current may also be changed depending on the state category. For example, the width of the range of not less than A3 and less than A4 (i.e., |A4-A3|) which is a range indicating a large current that tends to cause the deterioration of the battery may be narrower than the width of the range of not less than A2 and less than A3 (i.e., |A3-A2|) which is a range indicating a smaller current than the range of not less than A3 and less than A4. For example, the width of the range of not less than B4 and less than B5 (i.e., |B5-B4|) which is a range indicating a high temperature state that tends to cause the deterioration of the battery may be narrower than the width of the range of not less than B2 and less than B3 (i.e.,

|B3-B2|) which is lower in temperature than the range of not less than B4 and less than B5.

Referring back to FIG. 5, the meter device 19 periodically or non-periodically transmits the state history information, stored in the memory 19b, from the electric motorcycle 10 to the server 50 through the mobile terminal 40 carried by the user of the electric motorcycle 10. Specifically, when the meter device 19 and the mobile terminal 40 of the user are communicably connected to each other (Step S5), the CPU 19a of the meter device 19 transmits various pieces of information including the state history information and the battery identification information through the communicator 19d to the mobile terminal 40 (Step S6). The mobile terminal 40 transmits the received various pieces of information to the server 50 through the second communicator 45 (Step S7).

FIG. 8 shows a configuration example of data transmitted to the server 50 from the meter device 19 that is one example of the vehicle body-side electronic device. In addition to the state history information (in the present embodiment, the information indicating the frequencies of the state categories) and the battery identification information (also referred to as a battery ID), vehicle body identification information (also referred to as a vehicle body ID), user identification information (also referred to as a user ID), utilized type-of-industry information, detection period information, battery use time information, transmission date and time information, position identification information (also referred to as a position ID), and the like are transmitted to the server 50. These pieces of information transmitted to the server 50 are associated with each other.

The vehicle body identification information is information for identifying the vehicle body 11. The vehicle body identification information includes type-of-vehicle information indicating the type of the vehicle body 11. However, various pieces of information transmitted to the server 50 may include the type-of-vehicle information separately from the vehicle body identification information.

The user identification information is information for identifying the user of the vehicle body 11. The utilized type-of-industry information is information for classifying methods of utilizing the electric motorcycle 10. For example, whether the electric motorcycle 10 is utilized for hobby or leisure by a user, for work by a delivery company or the like, or for renting to a user by a rental company can be identified by the utilized type-of-industry information. The user identification information may include, for example, information indicating characteristics of the user or a country or region where the user lives. The user identification information may include the utilized type-of-industry information.

In the present embodiment, the vehicle body identification information, the user identification information, and the utilized type-of-industry information are stored in the memory 19b of the meter device 19. However, the vehicle body identification information, the user identification information, and the utilized type-of-industry information may be stored in a memory of another electronic device, such as the ECU 21, which is fixed to the vehicle body 11. Moreover, the user identification information, the utilized type-of-industry information, and the like stored in the memory may be able to be changed in such a manner that the user operates the meter device 19, the mobile terminal 40, or the like.

The detection period information is information indicating a detection period of original data (i.e., the battery state information) that has been used to generate the state history information transmitted to the server 50 together with the detection period information. To be specific, the detection period information indicates a detection period (from what time until what time) of the history of the state of the battery in the state history information transmitted to the server 50 together with the detection period information. For example, the detection period information may include information indicating the date and time at which the acquisition of the battery state information is started and the date and time at which the acquisition of the battery state information is terminated.

The battery use time information is information indicating a use time of the battery pack 30. For example, the battery use time information may be information indicating a time from a production date of the battery pack 30 until a present time. For example, the battery use time information may be information indicating a time elapsed since the user starts using the battery pack 30. The battery use time information may be information indicating a time in which electric power is being supplied to the vehicle body-side electronic device.

The transmission date and time information is information indicating the date and time at which various pieces of information including the state history information have been transmitted to the mobile terminal 40 or the server 50.

The position identification information is information for identifying a region where the vehicle body 11 exists. For example, the position identification information is information indicating a geographical position of the electric motorcycle 10 when the electric motorcycle 10 has transmitted information or when the electric motorcycle 10 has acquired the battery state information. For example, the position identification information may be positional information of the electric motorcycle 10 when the electric motorcycle 10 has transmitted information, the positional information being acquired by a GPS (Global Positioning System) receiver included in the electric motorcycle 10. For example, the position identification information may be information indicating the position of a base station which has relayed the information which has been transmitted from the electric vehicle 10. The position identification information may be country identification information given to the vehicle body. The position identification information may be existing region information registered in advance by, for example, the user of the electric motorcycle 10 as information of a region where the user lives or may be information acquired by, for example, a sensor.

In Steps S5 and S6 of FIG. 5, the electric motorcycle 10 may communicate with the mobile terminal 40 at predetermined timing. For example, the electric motorcycle 10 may be communicably connected to the mobile terminal 40 periodically at timing at which a starting operation of the electric motorcycle 10 has been performed, i.e., at timing at which the main switch has been turned on. As another example, the electric motorcycle 10 may be communicably connected to the mobile terminal 40 at non-periodical timing at which a driver has operated the electric motorcycle 10 or the mobile terminal 40 to command the communication connection between the electric motorcycle 10 and the mobile terminal 40. As yet another example, the electric motorcycle 10 may be communicably connected to a mobile terminal owned by a mechanic at maintenance timing of the electric motorcycle 10.

In the server 50, the received state history information and the received battery identification information are associated with each other and stored in the memory 52 (Step S8). After the server 50 stores the pieces of information, such as the state history information, transmitted from the vehicle body

11, the server 50 transmits storing completion information indicating the completion of the storing to the mobile terminal 40 (Step S9).

When the mobile terminal 40 receives the storing completion information from the server 50, the mobile terminal 40 transmits the storing completion information to the meter device 19 that is the electronic device of the vehicle body 11 (Step S10). When the meter device 19 acquires the storing completion information, the meter device 19 deletes the transmitted state history information (Step S11).

Figure 9:
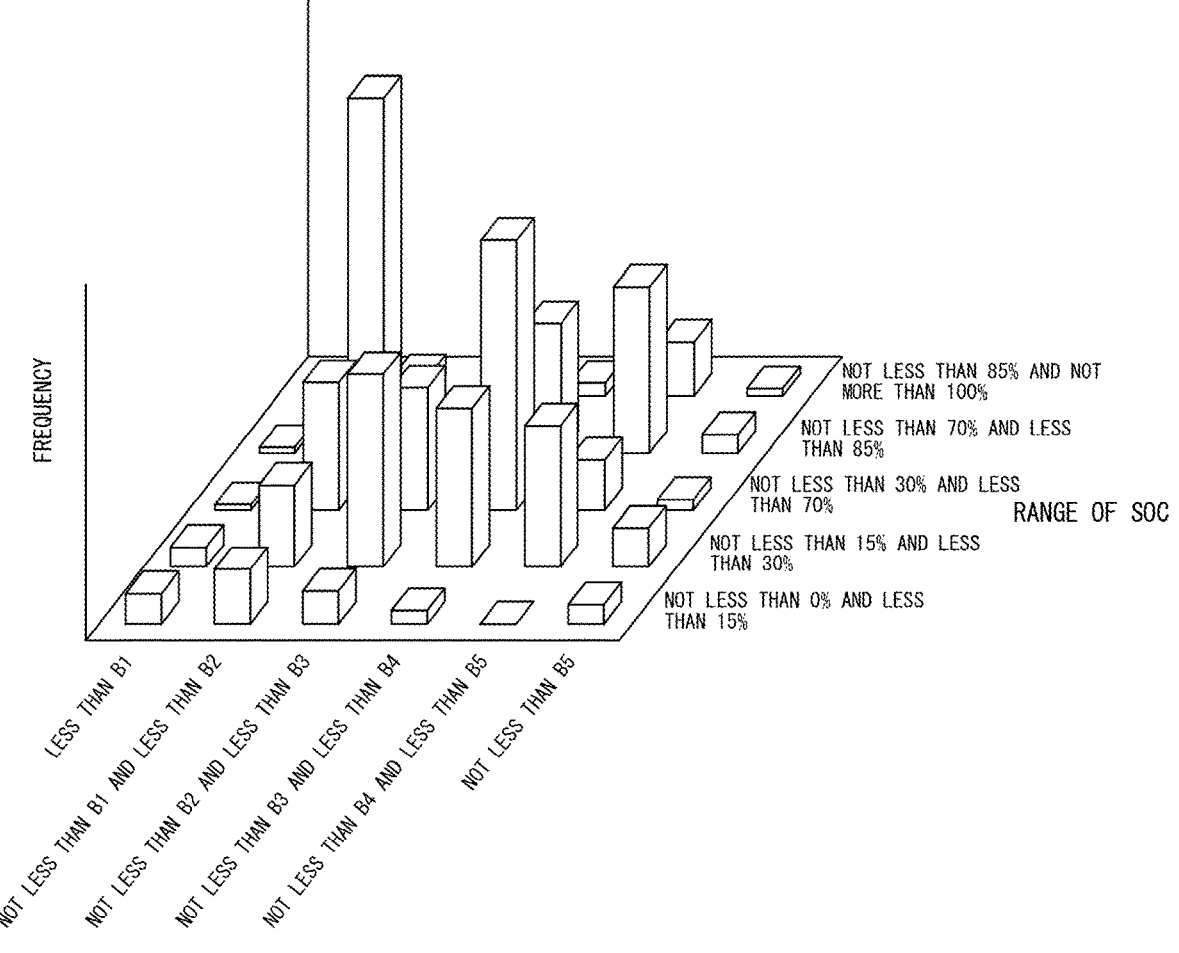
FIG. 9 is one example of a histogram showing the frequencies of the state categories.

As above, the state history information is accumulated in the server 50. The information terminal device 60 that is allowed to access the information stored in the server 50 can visualize and display the state of the battery pack 30 as a histogram, a table, or the like based on the state history information stored in the server 50. For example, FIG. 9 shows one example of the histogram showing the frequencies of the state categories. By outputting the frequencies of the state categories as the histogram to the display of the information terminal device 60 as above, the use history of the battery pack 30 is easily grasped. The information terminal device 60 may be a device used by a developer of the battery pack, a battery maintenance worker, or the like, or may be the mobile terminal 40 owned by the user.

In some cases, the battery pack 30 is detached from the vehicle body 11 and is mounted on another vehicle body 11. In this case, the server 50 newly receives and accumulates the state history information from the vehicle body 11 on which the battery pack 30 is mounted. The server 50 collects the state history information for each battery identification information of the battery pack 30. Thus, the server 50 can collect and manage a time course of the state of the battery pack 30.

More specifically, both the state history information acquired from the vehicle body on which the battery pack 30 was previously mounted and the state history information acquired from the vehicle body on which the battery pack 30 is currently mounted are information associated with the same battery identification information. Therefore, in the server 50, the state history information acquired from the vehicle body on which the battery pack 30 is currently mounted can be added to the state history information acquired from the vehicle body on which the battery pack 30 was previously mounted. As above, the state of the battery can be analyzed by utilizing not only the state history information acquired from the vehicle body 11 on which the battery pack 30 is currently mounted but also the state history information acquired from the vehicle body 11 on which the battery pack 30 was previously mounted. Therefore, the state of the battery can be grasped accurately.

In addition, based on the collected information, the server 50 can collect the state history information for each vehicle body identification information or collect the state history information for each user identification information. Moreover, the server 50 may change a condition regarding whether or not the battery pack 30 is usable, in accordance with the type of vehicle, the utilized type of industry, or the utilized region, and diagnose whether or not the battery pack 30 is usable.

For example, among the pieces of state history information stored in the server 50, the state history information associated with the vehicle body identification information indicating a vehicle body A and the state history information associated with the vehicle body identification information indicating a vehicle body B can be easily compared with each other. As above, the state history information can be collected for each vehicle body identification information.

Therefore, if the battery pack 30 is abnormal, for example, the vehicle body on which the battery pack 30 was mounted when the abnormality of the battery pack 30 has occurred can be easily analyzed.

Moreover, the server 50 is accessible from a terminal outside the server 50 and can transmit the information, collected in the server 50, from the server 50 to the terminal outside the server 50. Thus, the terminal outside the server 50 can perform diagnosis regarding whether or not the battery pack 30 is usable. Examples of the terminal outside the server 50 include: the information terminal device 60 that is allowed to access the information stored in the server 50; and the mobile terminal 40 owned by the user. Moreover, the terminal outside the server 50 may receive the result of the diagnosis of the battery pack 30 which has been performed in the server 50.

Based on the collected information, the CPU 51 of the server 50 can perform the diagnosis regarding whether or not the battery pack 30 is usable. When the server 50 diagnoses the battery pack 30, for example, the CPU 51 of the server 50 determines the degree of deterioration of the battery 31 from the pieces of state history information which are associated with the same battery identification information and stored in the memory 52. For example, based on the frequencies of factors that promote the deterioration, the CPU 51 determines the deterioration of the battery pack 30 or determines whether or not the battery pack 30 is usable. More specifically, when the time of the state category defined by the low or high SOC (for example, the range of not less than 0% and less than 15% or the range of not less than 85% and not more than 100%) exceeds a predetermined period of time, the CPU 51 may determine that the degree of deterioration is large. Similarly, when the time in which the temperature falls outside a predetermined range or the time in which the current excessively flows exceeds a predetermined period of time, the CPU 51 may determine that the degree of deterioration of the battery 31 is large. The developer of the battery pack or the battery maintenance worker may collect the battery pack 30 in which the degree of deterioration of the battery 31 is large, diagnose the battery pack 30 in detail, and evaluate whether or not the battery 31 is abnormal.

Moreover, the cause of the deterioration can be easily analyzed since this analyzation is based on the information collected in the server 50. Moreover, a group of drivers who cause the large degree of deterioration may be specified from the information collected in the server 50, and the use environment and driving operation of the electric motorcycle 10 which influence the deterioration of the battery 31 may be analyzed. Furthermore, required performance of the battery may be analyzed based on the information collected in the server 50. As above, by collecting the history information in the server 50, analyzation can be performed from various viewpoints.

Moreover, in Step S11, the state history information is deleted from the memory 19*b* of the meter device 19. In the present embodiment, all of the pieces of state history information are deleted from the memory 19*b*. However, some of the pieces of state history information may be deleted from the memory 19*b*. Furthermore, the state history information may not be deleted from the memory 19*b*. To be specific, Step S11 may be omitted.

For example, the state history information is associated with the battery identification information and stored in the memory 19*b*. When the battery pack 30 mounted on the vehicle body 11 is replaced with a new one, the state history information of the new battery pack 30 is associated with the battery identification information of the new battery pack 30 and stored in the memory 19*b*, separately from the state history information which was associated with the battery identification information of the previous battery pack 30 and stored. Each time the battery pack 30 mounted on the vehicle body 11 is replaced with a new one, a storage area for storing the state history information for each battery pack 30 is secured in the memory 19*b*. Therefore, the state history information may excessively use the memory capacity. On the other hand, the state history information which has already been transmitted to the server 50 does not have to be stored in the memory 19*b*. Therefore, the meter device 19 deletes the unnecessary state history information, such as the state history information which was associated with the battery identification information of the previous battery pack 30 and stored. For example, the unnecessary state history information may be deleted after the battery pack 30 is replaced with a new one.

For example, the communication connection between the meter device 19 and the mobile terminal 40 in Step S5 may be realized in such a manner that the user of the mobile terminal 40 starts a predetermined application program stored in the memory 42 of the mobile terminal 40. In this case, when the user does not start the application program, the state history information of the battery pack 30 is not collected in the server 50. Therefore, the electronic device of the vehicle body 11 may have a function of encouraging the user to communicate with the electronic device of the vehicle body 11 by the mobile terminal 40.

For example, when the communication connection between the meter device 19 and the mobile terminal 40 is not executed for predetermined days, the CPU 19*a* of the meter device 19 displays on the display 19*c* a message or warning that encourages the communication connection between the meter device 19 and the mobile terminal 40.

Or, the electric motorcycle 10 may be configured such that when the user rides the electric motorcycle 10, the electric motorcycle 10 does not travel if the communication connection between the meter device 19 and the mobile terminal 40 is not executed. For example, the CPU 21*a* of the ECU 21 determines whether or not the communication connection between the meter device 19 and the mobile terminal 40 has been executed. When it is determined that the communication connection between the meter device 19 and the mobile terminal 40 has not been executed, the CPU 21*a* of the ECU 21 does not transmit a command for supplying electric power to the electric motor 14, to the inverter device 22 even when the accelerator sensor 18 has detected an accelerator operation performed by the user.

As above, even when the communication between the mobile terminal 40 and the vehicle body-side electronic device requires the operation of the user since the electronic device of the vehicle body 11 has the function of encouraging the user to communicate with the electronic device of the vehicle body 11 by the mobile terminal 40, the state history information of the battery pack 30 is easily collected in the server 50.

Operational Advantages

As described above, according to the present embodiment, the state of the battery 31 is classified into the state category, and the frequency of the occurrence of the state of the battery 31 corresponding to the state category is stored in the memory 19*d*. Therefore, the increase in the memory capacity for storing the state of the battery 31 can be prevented as compared to when the pieces of battery state information detected by the BMU 32, the voltage sensor 34, the temperature sensor 35, and the current sensor 36 are accumulated in the memory 19$d$ (in other words, when values detected by various sensors are stored as time-series data).

Moreover, in the present embodiment, the frequency of the occurrence of the state of the battery 31 corresponding to the state category is stored as the category use time that is a time in which the battery 31 has been used in the state corresponding to the state category. Therefore, it is easy to grasp the state of the battery 31.

Moreover, in the present embodiment, the state category is a category defined by the combination of the state of charge of the battery and the discharge current of the battery or a category defined by the combination of the state of charge of the battery and the temperature of the battery. Therefore, information that is minimum as the use history of the battery can be extracted, and the memory capacity is easily reduced.

Moreover, in the present embodiment, as compared to a category (first category) which is defined by the state of charge of not less than 30% and less than 70% and in which the deterioration of the battery 31 hardly occurs, a category (second categories) which is other than the category defined by the state of charge of not less than 30% and less than 70% and in which the deterioration of the battery 31 tends to occur is subdivided, and therefore, the evaluation of the deterioration state of the battery 31 is facilitated.

Moreover, in the present embodiment, the state history information is associated with the vehicle body identification information and stored in the memory 19$b$. Therefore, the state history information is easily utilized as the history of the state of the battery.

Moreover, in the present embodiment, the state history information is associated with the battery identification information and stored in the memory 19$b$. Therefore, the state history information is easily utilized as the history of the state of the battery.

OTHER EMBODIMENTS

The present disclosure is not limited to the above-described embodiment. Various modifications may be made within the scope of the present disclosure.

In the above embodiment, the electric motorcycle is described as one example of the movable body including the vehicle body to and from which the battery pack is attachable and detachable. However, the movable body may be another type of movable body, such as an electric car. The movable body may be, for example, a hybrid vehicle including an internal combustion engine and an electric motor as traveling power sources. The movable body may be a bicycle, a four-wheeled vehicle, or the like instead of the motorcycle. The battery management method of the present disclosure is further suitably used by a straddled vehicle which is smaller in a margin of an accommodating space for mounting a large memory than a four-wheeled vehicle. The battery pack may be commonly used in movable bodies of different types. For example, after the battery pack is mounted on a two-wheeled vehicle, the battery pack may be mounted on a four-wheeled vehicle that is a different vehicle. The movable body on which the battery pack is mounted may be a machine, such as an electric working machine, which is not a vehicle. Examples of the electric working machine include a mower, an electric tool, and a cleaner. The movable body does not have to be a vehicle on which a user gets, and may be an unmanned movable body on which a user does not get.

In the above embodiment, the state history information is stored in the memory 19$b$ of the meter device 19. However, the memory in which the state history information is stored is not limited to this. For example, instead of the memory 19$b$ of the meter device 19, the state history information may be stored in the memory 21$b$ of the ECU 21, the memory 22$b$ of the inverter device 22, or the memory of the second controller 24. The state history information may be stored in a memory mounted on an outside-pack electric component which is fixed to the vehicle body and is an electric component other than the battery pack, in other words, may be stored in a vehicle body-side memory. It is preferable that the vehicle body-side memory be mounted on the outside-pack electric component which has another function in addition to the storage function.

Since the storage function of the memory located at the outside-pack electric component is utilized, a new storage device is unnecessary, and therefore, the number of parts can be reduced. Moreover, the function of the outside-pack electric component other than the storage function may be a control function of controlling an actuator that is a control target. In this case, the state history information is stored in a storage area that stores a program for executing the control function and calculation information for executing the program. Examples of the control function include meter control, engine control, and battery control, and in addition, control of actuators and sensors located at the vehicle body, such as brake control, suspension control, lamp control, control of a radar and a camera, and solenoid valve control. The state history information is stored in part of the storage area for the control function.

Moreover, the state history information stored in the memory as described above is generated in such a manner that the battery state information is processed into information whose amount of data is suppressed, as frequency information. Thus, the state history information is easily stored in the memory of the outside-pack electric component without exceeding the capacity of the memory of the outside-pack electric component. Moreover, as described above, after the transmission of the state history information from the memory of the outside-pack electric component to the server is terminated, at least a part of the transmitted state history information is deleted from the memory. Therefore, the state history information is easily stored in the memory of the outside-pack electric component without exceeding the capacity of the memory of the outside-pack electric component. Moreover, the number of outside-pack electric components used for storing the state history information is not limited to one and may be plural. Thus, the capacity for storing the state history information can be increased in the entire system. In the above description, the vehicle body-side memory has another function other than the storage function. However, the vehicle body-side memory is not limited to this and may be an electric component having only the storage function.

Moreover, for example, when the mobile terminal 40 is fixed to the vehicle body 11 through a motorcycle mobile terminal holder attachable to and detachable from the vehicle body 11, the state history information may be stored in the memory 42 of the mobile terminal 40 fixed to the vehicle body 11. To be specific, the memory of the mobile terminal 40 fixed to the vehicle body may also be "the vehicle body-side memory fixed to the vehicle body."

It is preferable that the vehicle body-side memory that stores the state history information have a function of being able to delete stored contents based on a command of processing circuitry and retaining stored contents even when power supply stops, as with the function of a flash memory.

Moreover, a memory of an electric component in the battery pack may be used as the memory that stores the state history information. Furthermore, a mobile terminal carried by a driver during driving is not fixed to the vehicle body, and a maintenance terminal held by a worker during maintenance is not fixed to the vehicle body. However, for example, as long as the mobile terminal or the maintenance terminal can communicate with the vehicle and transmit information to the server, the state history information may be stored in a memory of the mobile terminal which is not fixed to the vehicle body or in a memory of the maintenance terminal which is not fixed to the vehicle body.

Moreover, the processing circuitry is not limited to circuitry of the meter device 19, and processing circuitry of various controllers mounted on the vehicle can be utilized. For example, the processing circuitry may be circuitry of an ECU or circuitry of an inverter device. When a mobile terminal is fixed to the vehicle body, the processing circuitry may be circuitry of the mobile terminal. The processing circuitry may include pieces of circuitry included in electronic devices fixed to the vehicle body.

Regarding the electric components mounted on the vehicle body, the electric component that generates the state history information and the electric component that stores the generated state history information may be the same as each other or different from each other. For example, in the above embodiment, the CPU 19*a* of the meter device 19 generates the state history information as the frequency information from the received battery state information and stores the state history information in the memory 19*b*. However, circuitry of another electric component may generate the state history information, and a memory of another electric component may store the state history information. The circuitry of the electric component that generates the state history information may read the state history information (frequency information) stored in the past in the memory of the electric component that stores the state history information, and may add to the read frequency information the state history information that has been generated this time from the battery state information. Thus, the state history information indicating the frequencies accumulated from the past may be generated. The state history information generated as above may be stored in the memory of the electric component that stores the state history information, and thus, the information stored in the memory may be updated.

Moreover, in the above embodiment, the meter device is described as one example of the storage controller in the movable body on which the battery pack is mounted. However, the storage controller is not limited to this. The storage controller may be an ECU, an inverter device, or another electric component mounted on a vehicle body. The storage controller may include one or a plurality of devices other than the battery pack which are fixed to the vehicle body. Moreover, the storage controller may be a mobile terminal including a memory that stores the state history information.

In the above embodiment, the communicator that transmits the state history information to the mobile terminal 40 is part of the meter device 19. However, the communicator that transmits the state history information to the mobile terminal may be separated from the meter device or may be part of another device fixed to the vehicle body.

In the above embodiment, the state history information is transmitted from the electric motorcycle as the movable body to the server 50 through the mobile terminal carried by the user. However, the state history information may be transmitted from the movable body to the server without through the mobile terminal carried by the user. For example, communication circuitry including an antenna connectable to a public wireless network may be mounted on the vehicle body of the movable body. In this case, the state history information may be transmitted from the vehicle body to the server regardless of the presence or absence of the mobile terminal of the driver. The information may be transmitted from the movable body to the server through wireless communication or wired communication.

The categories shown in FIGS. 6 and 7 are shown merely as examples of the state categories. Methods of defining the state categories are not limited to these. For example, the widths of the ranges of the state of charge in the state categories may be equal to each other. For example, as shown in FIGS. 10, 11, and 12, the state category may be a category defined by only one of the state of charge of the battery 31, the discharge current of the battery 31, and the temperature of the battery 31. Moreover, the state category may be a category defined by a combination of two or more among the state of charge of the battery 31, the discharge current of the battery 31, and the temperature of the battery 31. The processing circuitry, such as a CPU, may classify the state of the battery based on the battery state information into one type of state category or plural types of state categories (for example, two or more types of state categories among the state categories shown in FIGS. 6, 7, 10, 11, 12, etc.).

The temperature of the battery tends to become high as the discharge current of the battery increases. Moreover, using the battery in a high temperature state may accelerate the deterioration of the battery. Therefore, it is thought that as described above, the deterioration of the battery further accelerates when the battery 31 whose temperature is different from normal temperature is used in a state where the state of charge is close to 100% or 0%, or when the discharge current of the battery 31 is large in a state where the state of charge is close to 100% or 0%. Therefore, as shown in FIGS. 6 and 7, defining the state category based on the relationship between the state of charge (SOC) and temperature related information indicating the temperature of the battery or a parameter (for example, the discharge current of the battery) which influences the temperature of the battery may be useful to grasp the degree of deterioration of the battery.

Moreover, the state categories may include a first category which is defined by at least the state of charge of the battery and a second category which is defined by at least the state of charge of the battery and tends to cause the deterioration of the battery more than the state of the battery corresponding to the first category, and the width of the state of charge corresponding to the second category may be made narrower than the width of the state of charge corresponding to the first category. This is preferable from the viewpoint of the ease of evaluation of the deterioration state of the battery.

For example, the state category may be defined by an item other than the state of charge of the battery 31, the discharge current of the battery 31, and the temperature of the battery 31. For example, FIG. 13 is a table showing one example of the frequencies of the state categories defined by control modes in a hybrid vehicle including an internal combustion engine and an electric motor as traveling power sources. As shown in FIG. 13, the frequencies corresponding to the control modes can be stored as the state history information. To be specific, one or more parameters defining the state category do not have to include the state of charge of the battery 31, the discharge current of the battery 31, and the temperature of the battery 31, or may include one or more out of the state of charge of the battery 31, the discharge current of the battery 31, and the temperature of the battery 31.

FIG. 9 is the histogram showing the frequencies of the state categories defined by the temperature of the battery 31 and the state of charge (SOC) of the battery 31. However, this is merely one example. For example, as shown in FIG. 14, the state history information displayed on the display of the information terminal device 60 may be shown by a histogram showing the frequency of the state category defined by one parameter.

In the electronic device of the vehicle body, the CPU stores the time (category use time) in which the battery 31 was used in the state corresponding to the state category, in the memory 19b as the frequency of the occurrence of the state of the battery 31 corresponding to the state category. However, the frequency of the occurrence of the state of the battery 31 corresponding to the state category does not have to be counted as the time. For example, as the frequency of the occurrence of the state of the battery 31 corresponding to the state category, the CPU may store in the memory 19b a ratio of the category use time to a total use time of the battery. To be specific, in the examples of FIGS. 6 and 7, the unit is the time. However, the unit may be a percentage (%). In this case, in the electronic device of the vehicle body, the CPU may also store the total use time of the battery in the memory. The total use time of the battery may also be transmitted from the electronic device of the vehicle body to the server together with the state hi story information.

Moreover, the frequency of the state category may be calculated as the number of times the state of the battery belongs to the state category or as the number of times the state of the battery belonging to the state category gets out of the state category. Or, the frequency of the state category may be calculated so as to be increased when the state of the battery belongs to the state category for a predetermined time (for ten minutes, for example). When the state category is defined by the range of the SOC of the battery, the number of times the SOC of the battery when charging or discharging of the battery is started belongs to the state category may be counted as the frequency information of the state category.

Various pieces of information transmitted from the movable body to the server are not limited to those described in the above embodiment. For example, various pieces of information transmitted to the server may not include at least one or any of the vehicle body identification information (vehicle body ID), the user identification information (user ID), the utilized type-of-industry information, the detection period information, the battery use time information, the transmission date and time information, and the position identification information. Various pieces of information transmitted to the server may include another piece of information, such as the total number of times of the charging. The total charging and discharging amount and the SOC may also be transmitted to the server.

In the above embodiment, the state history information indicating the history of the state of the battery 31 is stored as the information indicating the accumulation of the time in which the battery 31 belongs to a predetermined state. However, the method of storing the state history information is not limited to this. For example, the time-series data of the detected value of the sensor (i.e., raw data, battery state information) may be stored as the state history information in the memory. In other words, the state history information stored in the memory may be information generated as the frequency information from the battery state information, the battery state information itself, or another type of information, other than the frequency information, generated by processing the battery state information.

In the above embodiment, the state of charge of the battery 31, the temperature of the battery 31, and the discharge current of the battery 31 are described as the examples of the battery state information indicating the state of the battery 31. The method of measuring or calculating the battery state information is not especially limited. For example, the inverter device 22 may include a current sensor that detects a current input to the inverter device 22. In this case, the detected value of the current sensor of the inverter device 22 may be the discharge current of the battery 31.

The battery state information is not limited to the state of charge of the battery 31, the temperature of the battery 31, and the discharge current of the battery 31. The battery state information may not include at least one or any of the state of charge of the battery 31, the temperature of the battery 31, and the discharge current of the battery 31. For example, the battery state information indicating the state of the battery 31 may include information indicating the posture (inclination, for example) of the battery 31, information indicating the acceleration of the battery 31, information indicating the geographical position of the battery 31 (in other words, information indicating where the vehicle body is moving), or the like. To be specific, examples of the sensor that detects the information (battery state information) indicating the state of the battery 31 may include a battery management unit, a temperature sensor, a current sensor, a gyro sensor, an acceleration sensor, a GPS receiver, an ECU, and the like.

The sensor that detects the battery state information indicating the state of the battery 31 may be incorporated in the battery pack or may be fixed to the vehicle body to which the battery pack is attached.

In Steps S2 and S3 described in the above embodiment, while electric power is supplied from the battery 31 to the electric motor 14, the battery management unit 32 outputs the battery state information and the battery identification information to the CAN 20 at all times. However, the battery management unit 32 does not have to output the battery state information and the battery identification information to the CAN 20 at all times. For example, the battery management unit 32 may output the battery identification information to the CAN 20 when the main switch that sets the electric motorcycle 10 to a travelable state is turned on, and does not have to output the battery identification information to the CAN 20 until the main switch is turned off. Moreover, for example, while the main switch is in an on state, the battery management unit 32 may periodically output the battery state information to the CAN 20.

Moreover, for example, the battery management unit 32 may output the state history information as the frequency information to the CAN 20 instead of the battery state information. To be specific, the CPU 32a of the battery management unit 32 may generate the state history information as the frequency information from the battery state information and output the generated state history information to the CAN 20. When the battery pack 30 includes communication circuitry that communicates with the mobile terminal 40 or the server 50, the CPU 32a of the battery management unit 32 may generate the state history information as the frequency information from the battery state information and transmit the generated state history information directly to the mobile terminal 40 or the server 50 through the communication circuitry.

Steps S8 and S9 described in the above embodiment are executable in the mobile terminal 40, not in the server 50. For example, after Step S6, the mobile terminal 40 may associate the received state history information, the received battery identification information, and the received vehicle body identification information with each other and store them in the memory 42. In the mobile terminal 40, from the pieces of state history information which are associated with the same battery identification information and stored in the memory 42, the CPU 41 may diagnose the state of the battery 31 corresponding to this battery identification information. To be specific, the battery packs 30 that have been mounted on the movable body 10 owned by the user can be managed by the mobile terminal 40 of the user.

In the above embodiment, the CPU 19a of the meter device 19 transmits the vehicle body identification information together with the state history information and the battery identification information to the mobile terminal 40 through the communicator 19d. However, the vehicle body identification information does not have to be transmitted from the device of the vehicle body 11 to the mobile terminal 40 and the server 50. The user identification information for identifying the user of the vehicle body may be transmitted from the device of the vehicle body 11 to the mobile terminal 40 and the server 50 together with the state history information and the battery identification information. The user identification information for identifying the user of the vehicle body may be, for example, purchaser information indicating a purchaser who bought the vehicle body or a user information indicating a user who rented the vehicle body from a rental company.

The state history information of the battery pack collected in the memory of the server can be utilized for various uses. For example, the state history information of the battery pack collected in the memory of the server can be utilized to determine the degree of deterioration of the battery of the battery pack 30, and in addition, can be utilized by the developer of the battery pack to optimize a durability condition of the battery pack. For example, the state history information of the battery pack collected in the memory of the server can be utilized to disclose the state of the battery pack to the user.

The functionality of the elements disclosed herein may be implemented using circuitry or processing circuitry which includes general purpose processors, special purpose processors, integrated circuits, ASICs ("Application Specific Integrated Circuits"), conventional circuitry or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware or processor.

Disclosed Aspects

The following aspects disclose preferred embodiments.

First Aspect

A battery management method including:

detecting information by at least one sensor, the information being related to a state of a battery mounted on a vehicle body;

classifying the state of the battery into any one of predetermined state categories based on the information detected by the at least one sensor; and storing in a memory a frequency of occurrence of the state of the battery corresponding to the state category.

According to the above method, the state of the battery is classified into the state category, and the frequency of the occurrence of the state of the battery corresponding to the state category is stored. Therefore, the increase in the memory capacity for storing the state of the battery can be prevented as compared to when data detected by a sensor is accumulated in the memory.

Second Aspect

The battery management method according to the first aspect, wherein:

the frequency denotes a category use time in which the battery has been used in the state corresponding to the state category; or the frequency denotes a ratio of the category use time to a total use time of the battery.

According to the above method, it is easy to grasp the state of the battery.

Third Aspect

The battery management method according to the first or second aspect, wherein each of the state categories is a category defined by a state of charge of the battery, a discharge current of the battery, a temperature of the battery, or a combination of two or more among the state of charge of the battery, the discharge current of the battery, and the temperature of the battery.

According to the above method, information that is minimum as the use history of the battery can be extracted, and the memory capacity is easily reduced.

Fourth Aspect

The battery management method according to any one of the first to third aspects, wherein:

the state categories include a first category and a second category that is a category of the state of the battery which tends to cause deterioration of the battery more than the state of the battery corresponding to the first category; and a range of information related to the state of the battery corresponding to the second category is smaller than a range of information related to the state of the battery corresponding to the first category.

According to the above method, by subdividing the range in which the deterioration of the battery tends to occur, the evaluation of the deterioration state of the battery is facilitated.

Fifth Aspect

The battery management method according to any one of the first to fourth aspects, wherein:

the state categories are defined by at least a state of charge of the battery;

the state categories include a first category including the state of the battery in which the state of charge of the battery is 50% and second categories other than the first category; and a width of the state of charge corresponding to each second category is narrower than a width of the state of charge corresponding to the first category.

According to the above method, by subdividing the range in which the deterioration of the battery accelerates, and the state of charge is close to 0% or 100%, the evaluation of the deterioration state of the battery is facilitated.

Sixth Aspect

The battery management method according to any one of the first to fifth aspects, wherein vehicle body identification information for identifying the vehicle body on which the battery is mounted is stored in the memory together with the frequencies corresponding to the respective state categories.

According to the above method, the frequency of occurrence of the state of the battery corresponding to the state category is easily utilized as the history of the state of the battery.

Seventh Aspect

The battery management method according to any one of the first to sixth aspects, wherein battery identification information for identifying the battery is stored in the memory together with the frequencies corresponding to the respective state categories.

According to the above method, the frequency of occurrence of the state of the battery corresponding to the state category is easily utilized as the history of the state of the battery.

Eighth Aspect

The battery management method according to any one of the first to seventh aspects, wherein position identification information for identifying an existing region of the vehicle body is stored in the memory together with the frequencies corresponding to the respective state categories.

According to the above method, the frequency of occurrence of the state of the battery corresponding to the state category is easily utilized as the history of the state of the battery.

Ninth Aspect

A computer-readable storage medium storing a battery management program for managing a battery mounted on a vehicle body, the battery management program causing a computer to execute:

classifying a state of the battery into any one of predetermined state categories based on information which is detected by at least one sensor and related to the state of the battery; and storing a frequency of occurrence of the state of the battery corresponding to the state category.

Tenth Aspect

A storage controller including:

an interface that receives information related to a state of a battery mounted on a vehicle body;

a memory; and processing circuitry, wherein:

the processing circuitry classifies the state of the battery into any one of predetermined state categories based on the received information; and the processing circuitry stores in a memory a frequency of occurrence of the state of the battery corresponding to the state category.

According to the above configuration, the increase in the memory capacity for storing the state of the battery can be prevented.

Eleventh Aspect

A movable body including:

a vehicle body;

at least one sensor that detects information related to a state of a battery mounted on the vehicle body;

a memory; and processing circuitry that classifies the state of the battery into any one of predetermined state categories based on the information detected by the at least one sensor and stores in the memory a frequency of occurrence of the state of the battery corresponding to the state category.

According to the above configuration, the increase in the memory capacity for storing the state of the battery can be prevented.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

The invention claimed is:

1. A battery management method comprising:

detecting, over time, a value of a parameter of a battery by at least one of a temperature sensor, a voltage sensor, or a current sensor mounted on the battery or a vehicle on which the battery is mounted, the parameter comprising at least one of a temperature, a voltage, or a discharge current of the battery that reflects a state of deterioration of the battery;

calculating, by processing circuitry of the battery or the vehicle, a state of charge (SOC) of the battery based on a voltage value detected by the voltage sensor and the discharge current detected by the current sensor;

classifying, by the processing circuitry of the battery or the vehicle, a state of the battery defined by a combination of the SOC and either one of the discharge current or the temperature into a state category of a plurality of predetermined state categories, wherein the state category is formed by a sub-range of a plurality of sub-ranges of values of the SOC and either one of a sub-range of a plurality of sub-ranges of values of the discharge current, or a sub-range of a plurality of sub-ranges of values of the temperature;

storing in a memory of the vehicle, as state history information, an amount of time of the state of the battery being classified into the state category and associated battery identification information, the battery identification information being associated with the battery for identifying the battery;

transmitting, over a network, the stored state history information to a server;

analyzing, by the server, the state of the deterioration of the battery based on amounts of time corresponding to the plurality of predetermined state categories and the associated battery identification information; and determining, by the server, that the battery is not usable when the amount of time corresponding to a state category that corresponds to a combination of a sub-range of the SOC that is lower than a predetermined SOC value or higher than a predetermined SOC value, and either one of a sub-range of the temperature lower than a predetermined temperature value or higher than a predetermined temperature value, or a sub-range of the discharge current higher than a predetermined discharge current value, exceeds a predetermined period of time.

2. The battery management method according to claim 1, wherein:

an amount of time of the amounts of time denotes a category use time amount that is an amount of time in which the battery has been used in the state corresponding to the state category; or the amount of time denotes a ratio of the category use time amount to a total amount of use time of the battery.

3. The battery management method according to claim 1, wherein:

the state categories include a first category and a second category that is a category of the state of the battery which tends to cause deterioration of the battery more than the state of the battery corresponding to the first category; and a width of the sub-range of the SOC or a width of the sub-range of either one the temperature or the discharge current corresponding to the second category is smaller than a corresponding width of the sub-range of the SOC or a corresponding width of the sub-range of either one of the temperature or the discharge current corresponding to the first category.

4. The battery management method according to claim 1, wherein:

the state categories include:

a first category corresponding to the sub-range of the SOC in which 50% is included; and second categories other than the first category; and a width of the sub-range of the SOC corresponding to each of the second categories is narrower than a width of the sub-range of the SOC corresponding to the first category.

5. The battery management method according to claim 1, wherein vehicle identification information for identifying the vehicle on which the battery is mounted is stored in the memory together with the amounts of time corresponding to the respective state categories.

6. The battery management method according to claim 1, wherein position identification information for identifying an existing region of the vehicle is stored in the memory together with the amounts of time corresponding to the respective state categories.

7. The battery management method according to claim 1, further comprising specifying, by the server, the vehicle on which an abnormality of the battery has occurred.

8. The battery management method according to claim 1, further comprising specifying, by the server, a factor that causes the deterioration of the battery.

9. The battery management method according to claim 1, further comprising specifying, by the server, use environment or driving operation of the vehicle which influences the deterioration of the battery.

10. The battery management method according to claim 1, wherein:

the battery includes a battery pack detachably mounted to the vehicle; and the memory includes a memory mounted on an outside-pack electric component which is an electric component of the vehicle body other than the battery pack.

11. The battery management method according to claim 1, wherein the memory stores one or more programs which when executed by one or more processors, cause the one or more processors to execute one or more of meter control, engine control, battery control, brake control, suspension control, lamp control, radar control, camera control, solenoid valve control, actuator control, and sensor control in the vehicle.

* * * * *